United States Patent [19]
Redman

[11] Patent Number: 5,992,470
[45] Date of Patent: Nov. 30, 1999

[54] FLUID COUPLING APPARATUS

[76] Inventor: Robert J. Redman, 8230 M-68, Indian River, Mich. 49749

[21] Appl. No.: 09/103,224

[22] Filed: Jun. 23, 1998

[51] Int. Cl.[6] ....................................................... F16L 9/00
[52] U.S. Cl. .......................... 138/177; 138/109; 138/155; 285/179
[58] Field of Search ................................... 138/177, 178, 138/109, 120, 155, 103; 285/179

[56] References Cited

U.S. PATENT DOCUMENTS

| Re. 12,688 | 8/1907 | Oakes | 285/130.1 |
|---|---|---|---|
| 1,980,080 | 11/1934 | Niles | 285/179 X |
| 3,263,244 | 8/1966 | Katz | 4/252 |
| 3,388,705 | 6/1968 | Grosshandler | 138/109 X |
| 4,159,027 | 6/1979 | Caillet | 138/109 X |
| 4,173,361 | 11/1979 | Gagas | 285/64 |
| 4,459,318 | 7/1984 | Hyans | 138/109 X |

Primary Examiner—Patrick Brinson
Attorney, Agent, or Firm—Young & Basile, P.C.

[57] ABSTRACT

A fluid coupling apparatus for communicating fluid between a fluid hose and a heat exchanger wherein the fluid coupling apparatus minimizes or eliminates the spacing required or necessitated from the bending of a fluid hose. The present invention provides a hollow substantially cylindrical first portion defining a first passageway communicatable with a fluid hose, and a hollow substantially rectangular second portion integrally extending from said first portion. The second portion of the present invention has at least one substantially flat surface wherein an aperture extends through the flat surface of the second portion to provide a second passageway in communication with the first passageway and in communication with the heat exchanger. The second portion has an annular raised shoulder or lip which further defines the aperture and which is utilized to connect the fluid coupling apparatus to the heat exchanger.

16 Claims, 1 Drawing Sheet

FLUID COUPLING APPARATUS

The invention relates to a fluid coupling apparatus for communicating fluids between a fluid hose and a heat exchanger, and in particular, a fluid coupling apparatus having a passageway that directs fluid from a fluid hose to a heat exchanger while minimizing or eliminating the spacing associated with bending a fluid coupling or hose.

BACKGROUND OF THE INVENTION

In general, engine compartments of cars, motorcycles and similar machines are lubricated and cooled by using engine or motor oil. Typically, the engine or motor oil is cooled by circulating the engine oil through an oil cooler or heat exchanger. The heat exchanger is in communication with an engine block and oil filter and provides a circulating passageway for the engine oil. The heat exchanger is also in communication with the engine's coolant wherein the engine coolant circulates throughout the heat exchanger to cool the engine oil.

Due to the limited amount of spacing which typically exist in most engine compartments, especially the area surrounding the engine block, fluid hose lines directing the engine coolant to and from the heat exchanger must be connected to the heat exchanger in a manner that minimizes the amount of spacing required between the heat exchanger and the fluid hose lines. This can be difficult to accomplish when the engine coolant lines extend parallel to a substantially flat surface of the heat exchanger in which the fluid lines access the heat exchanger. This requires that the fluid lines be bent at a substantially right angle to communicate with an access provided in the flat surface of the heat exchanger. When bending the fluid hose lines, a certain amount of space or clearance must be provided for the bend or elbow so that the fluid hose line does not kink or fold thus prohibiting or restricting fluid from passing through the fluid hose line and communicating with the heat exchanger.

To minimize the clearance and spacing required of bending fluid hose lines, known designs have welded or brazed a rectangular steel block onto the end of a seamless welded tubing. A 90° bore is machined through the steel block so as to provide a passageway extending from the steel tube, through the steel block, and into an inlet or access provided in a wall of the heat exchanger. The steel block is brazed to the wall of the heat exchanger to prohibit any leaking or dislodging of the steel block from the heat exchanger. This known design minimizes the clearance associated with bending fluid coupling lines, but the design is laborious and expensive to manufacture, which is undesireable in a production environment.

SUMMARY OF THE INVENTION

The present invention solves the above-mentioned shortcomings by providing an integral fluid coupling apparatus that communicates fluid between a fluid hose line and a heat exchanger while eliminating or minimizing the spacing associated with bending a fluid coup ling or hose. The fluid coupling apparatus provides a substantially cylindrical hollow first portion defining a first passageway in communication with an engine coolant hose. The fluid coupling apparatus also provides a substantially rectangular hollow second portion integrally extending from the first portion and having a second passageway defined by the second portion. The second passageway is in communication with the first passageway and extends through an aperture provided in a wall of the substantially rectangular second portion. The second portion provides a raised shoulder or lip which extends outwardly from the wall of the second portion and is coaxial with the aperture provided in the wall of the second portion. The shoulder or lip is utilized to connect the fluid coupling apparatus to the heat exchanger.

The first portion of the fluid coupling apparatus has a first bead or raised annular shoulder that is coaxial with the longitudinal axis of the first portion. The first portion tapers radially inward from the first bead toward an open end of the first portion. The first bead and taper help secure and receive, respectively, the fluid hose line. The first portion of the fluid coupling apparatus also provides a second bead axially spaced from the first bead. The second bead extends radially outward and prevents the fluid hose from extending beyond the second bead.

To this end, the objects of the present invention are to provide a new and improved inexpensive fluid coupling apparatus for communicating fluid between a fluid hose line and a heat exchanger without the clearance and spacing associated with bending fluid hoses.

BRIEF DESCRIPTION OF THE DRAWINGS

The various and other uses of the present invention will become apparent by referring to the following detailed descriptions and drawings in which.

DESCRIPTION OF THE PREFERRED EMBODIMENT

Figure 1:
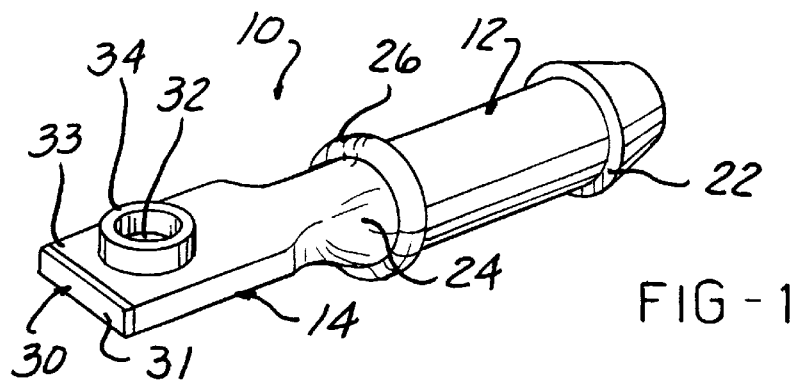
FIG. 1 is a perspective view of the present invention.
Figure 2:
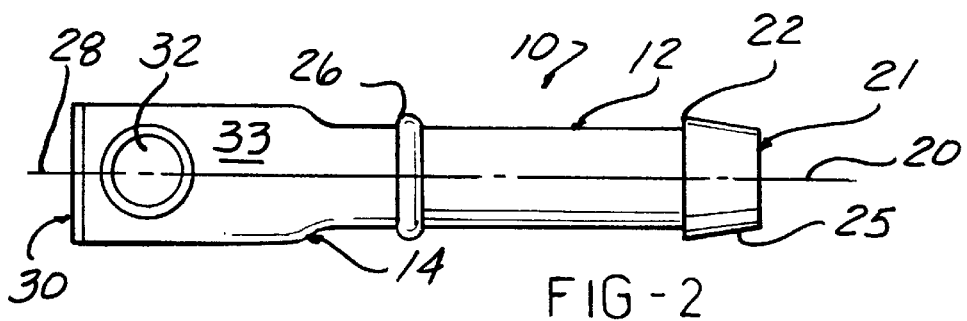
FIG. 2 is a top plan view of the present invention.
Figure 3:
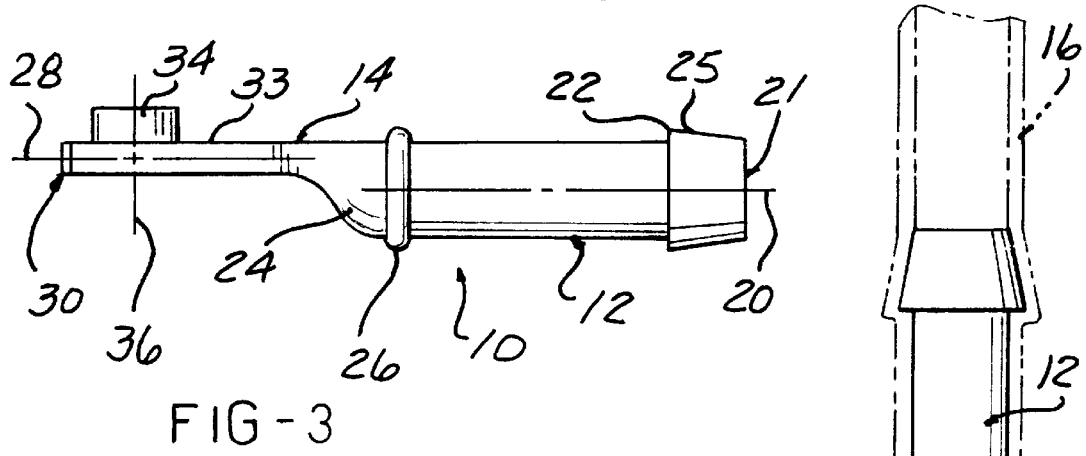
FIG. 3 is a side plan view of the present invention.
Figure 4:
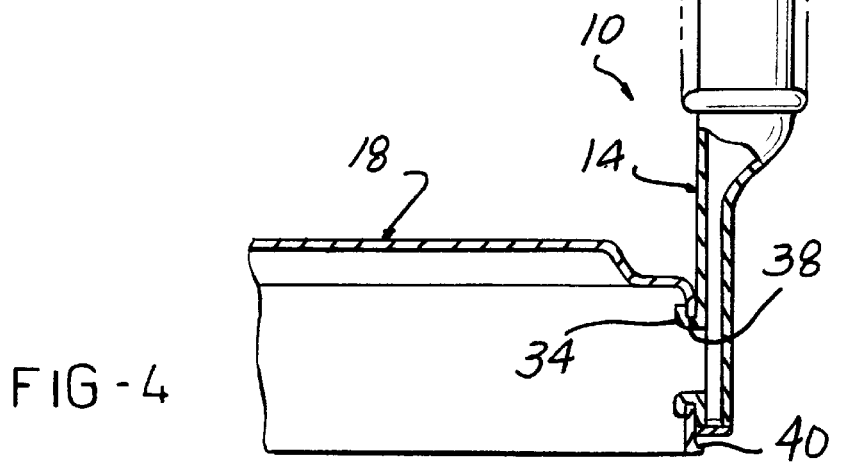
FIG. 4 is a partially sectioned side view of the present invention connected to a heat exchanger and a fluid hose.

FIGS. 1–4 show a fluid coupling apparatus 10 as defined by the present invention. Although the present invention may be utilized in conjunction with a variety of fluid containment and circulation systems, the present invention is best suited for communicating fluid between a flexible fluid hose 16 and an engine oil heat exchanger 18, as seen in FIG. 4. Thus, the remainder of the detailed description will refer to and reference the present invention in conjunction with heat exchangers and fluid hoses, although it is to be understood that the present invention may be utilized in conjunction with a variety of fluid hoses and circulation devices.

The fluid coupling apparatus 10 of the present invention provides a first portion 12 and a second portion 14 wherein the first portion 12 is connectable to and communicatable with the fluid hose 16. The fluid hose 16 typically carries engine coolant from an engine coolant reservoir (not shown) to an engine oil heat exchanger 18 wherein engine oil (not shown) is circulated and cooled by the engine coolant (not shown). The second portion 14 of the fluid coupling apparatus 10 is connectable to and communicatable with the heat exchanger 18. The first and second portions 12, 14 of the fluid coupling apparatus 10 are integrally formed and preferably fabricated from a seamless welded 1020 cold rolled steel.

To engage and communicate with the fluid hose 16, the first portion 12 of the fluid coupling apparatus 10 has a hollow, substantially cylindrical configuration having a longitudinal axis 20. The first portion 12 has an open end 21 for transferring engine coolant to or from the fluid hose 16 and a second end or transition area 24 which integrally connects the first portion 12 to the second portion 14. A first bead or raised annular shoulder 22 is formed toward the open end 21 of the first portion 12 of the apparatus 10 for receiving and retaining the fluid hose 16. The first bead 22 extends radially outward from the first portion 12 of the apparatus 10, and the first portion 12 tapers radially inward from the first bead 22 toward the open end 21. The taper 25 reduces the diameter of the open end 21 of the first portion 12 of the apparatus 10 to a diameter less than the first portion 12 to accommodate reception of the fluid hose 16 onto the first portion 12.

A second bead or annular shoulder 26 is provided on the first portion 12 of the apparatus 10 to prevent the fluid hose 16 from moving onto the second portion 14 of the apparatus 10. The second bead 26 extends radially outward from the first portion 12 of the apparatus 10 and is axially spaced along the longitudinal axis 20 of the first portion 12 from the first bead 22 toward the second portion 14 of the apparatus 10. The second bead 26 acts as a positive stop in prohibiting the fluid hose 16 from extending beyond the second bead 26.

To integrally transform the substantially cylindrical configuration of the first portion 12 to the substantially rectangular configuration of the second portion 14, the first portion 12 transforms into the configuration of the second portion 14 at the transition area 24. Both the first portion 12 and the second portion 14 have corresponding ends which essentially meld at the transition area 24.

In order to communicate fluid to the heat exchanger 18 without requiring the spacing associated with bending the fluid lines 16, the second portion 14 of the apparatus 10 provides a hollow substantially rectangular configuration having a longitudinal axis 28 that is substantially parallel to and offset from the longitudinal axis 20 of the first portion 12. The second portion 14 has a closed end 30 which is opposite the end of the transition area 24. The closed end 30 of the second portion 14 is formed by slotting the ends of the sides of the second portion 14 and folding the sides inward so as to partially overlap one another. A cap 31 is brazed on to the end of the second portion 14 to close and seal the second portion 14 of the fluid coupling apparatus 10.

To transmit fluid through the second portion 14 of the fluid coupling apparatus 10, the second portion 14 provides an aperture 32 extending through a substantially flat wall 33 of the second portion 14. The aperture 32 has a longitudinal axis 36 that is substantially perpendicular to the longitudinal axes 20, 28 of the first and second portions, 12, 14, respectively. A raised shoulder or lip 34 extends integrally outward from the wall 33 of the second portion 14 and is coaxial with the longitudinal axis 36 of aperture 32.

As seen in FIG. 4, the fluid coupling apparatus 10 is secured to the heat exchanger 18 by inserting the raised shoulder 34 of the second portion 14 of the apparatus 10 through an aperture 38 provided in a side wall 40 of the heat exchanger 18 so that the second portion 14 substantially abuts or is adjacent the wall 40 of the heat exchanger 18. Preferably, the raised shoulder 34 of the second portion 14 is rolled onto the interior portion of the heat exchanger 18 defining the aperture 38 in the side wall 40 of the heat exchanger 18. The rolled shoulder 34 is brazed onto the interior of the side wall 40 of the heat exchanger 18 so as to provide a sealed and secured connection between the fluid coupling apparatus 10 and the heat exchanger 18.

It should be noted that the present invention is not limited to connecting the fluid coupling apparatus 10 to the heat exchanger 18 and/or the fluid hose 16 as defined, but rather, the fluid coupling apparatus 10 may be connected to the heat exchanger 18 and/or the fluid hose 16 in any manner which minimizes or eliminates the clearance required for bending fluid tubing and/or couplings.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fluid coupling apparatus for communicating fluid between a fluid hose and a heat exchanger, comprising:

a first portion defining a first passageway communicatable with said fluid hose;

a second portion integrally extending from said first portion, and said second portion having at least one surface immediately adjacent said heat exchanger; and a second passageway defined by said second portion and extending through said at least one surface to place said second passageway in communication with said first passageway and communicatable with said heat exchanger.

2. The fluid coupling apparatus stated in claim 1, further comprising:

said second passageway having an aperture extending through said at least one surface; and a shoulder extending outward from said at least one surface to further define said aperture, and said shoulder directly connectable to said heat exchanger wherein said shoulder is in direct contact with said heat exchanger.

3. The fluid coupling apparatus stated in claim 1, further comprising:

said first portion having a hollow, substantially cylindrical configuration wherein said first portion is connectable to said fluid hose.

4. The fluid coupling apparatus stated in claim 1, further comprising:

said second portion having a hollow substantially rectangular configuration.

5. The fluid coupling apparatus stated in claim 1, further comprising:

said tubular coupling apparatus fabricated from a seamless welded tube.

6. A fluid coupling apparatus for connecting a fluid hose to a heat exchanger comprising:

a substantially cylindrical hollow first portion defining a first passageway communicatable with said fluid hose;

a substantially rectangular hollow second portion integrally extending from said first portion and having at least one substantially flat surface;

a second passageway defined by said second portion and extending through said flat surface, and said second passageway in communication with said first passageway and communicatable with said heat exchanger; and, said flat surface having a portion abutting said heat exchanger to minimize the spacing required to direct fluid to and from said heat exchanger.

7. The fluid coupling apparatus stated in claim 6, further comprising:

said second passageway having an aperture extending through said at least one flat surface of said rectangular portion and having a raised shoulder extending outward from said at least one substantially flat surface to further define said aperture.

8. The fluid coupling apparatus stated in claim 6, further comprising:

said first portion having a first longitudinal axis, and said second portion having a second longitudinal axis substantially parallel and offset from said first longitudinal axis.

9. The fluid coupling apparatus stated in claim 8, further comprising:

said aperture having a third longitudinal axis substantially perpendicular to said first and second longitudinal axes.

10. The fluid coupling apparatus stated in claim 6, further comprising:

said fluid coupling apparatus fabricated from a seamless welded metallic tubing.

11. The fluid coupling apparatus stated in claim 6, further comprising:

said first portion having a first raised annular shoulder coaxial with said first longitudinal axis and located toward an open end of said first portion, and said first portion tapered radially inward from said annular shoulder to said open end of said first portion wherein said open end of said first portion is connectable to said fluid hose.

12. The fluid coupling apparatus stated in claim 6, further comprising:

said first portion having a second raised annular shoulder coaxial with said first longitudinal axis and located between said second portion and said first shoulder, and said second annular shoulder preventing said connectable fluid hose from moving beyond said second shoulder.

13. A fluid coupling apparatus for communicating fluid from a fluid hose to a heat exchanger, comprising:

a substantially cylindrical hollow first portion defining a first passageway communicatable with said fluid hose, and said first portion having a first longitudinal axis;

a substantially rectangular hollow second portion integrally extending from said first portion and defining a second passageway in communication with said first passageway, and said second portion having at least one substantially flat surface having a portion abutting said heat exchanger and a second longitudinal axis substantially parallel and offset from said first longitudinal axis;

said second portion having an aperture extending through said at least one flat surface and a raised shoulder extending outwardly from said flat surface further defining said aperture, and said raised shoulder directly connectable to said heat exchanger; and said aperture having a third longitudinal axis substantially perpendicular to said first and second longitudinal axes.

14. The fluid coupling apparatus as stated in claim 13, further comprising:

said fluid coupling apparatus fabricated from a seamless welded steel tubing.

15. The fluid coupling apparatus as stated in claim 13, further comprising:

said first portion having a first raised annular shoulder coaxial with said first longitudinal axis and located toward an open end of said first portion, and said cylindrical portion tapered radially inward from said annular shoulder to said open end of said cylindrical portion wherein said open end of said first portion is connectable to said fluid hose.

16. The fluid coupling apparatus as stated in claim 13, further comprising:

said first portion having a second raised annular shoulder coaxial with said first longitudinal axis and located between said second portion and said first shoulder, and said second annular shoulder preventing said connectable fluid hose from moving beyond said second shoulder.

* * * * *